(12) United States Patent
Teeple

(10) Patent No.: US 6,665,941 B1
(45) Date of Patent: Dec. 23, 2003

(54) WEED CUTTER

(76) Inventor: Robert A. Teeple, 6724 W. US 6, Gibsonburg, OH (US) 43431

( * ) Notice: Subject to any disclaimer, the term of this patent is extended or adjusted under 35 U.S.C. 154(b) by 0 days.

(21) Appl. No.: 09/980,332

(22) PCT Filed: May 16, 2000

(86) PCT No.: PCT/US00/13444
§ 371 (c)(1), (2), (4) Date: Nov. 30, 2001

(87) PCT Pub. No.: WO00/74902
PCT Pub. Date: Dec. 14, 2000

Related U.S. Application Data
(60) Provisional application No. 60/137,299, filed on Jun. 3, 1999.

(51) Int. Cl.[7] .......................... B26B 7/00; A01D 34/67; A01G 3/06
(52) U.S. Cl. .......................... 30/276; 30/278; 30/279.4; 56/12.7; 56/12.8; 56/17.4
(58) Field of Search ....................... 30/276, 278, 279.4, 30/279.2; 56/12.7, 12.8, 12.9, 13.1, 13.3, 13.4, DIG. 20, 16.7, 17.4, 17.5

(56) References Cited

U.S. PATENT DOCUMENTS

| | | |
|---|---|---|
| 2,724,229 A | 11/1955 | Graham |
| 2,763,116 A | 9/1956 | Flinchbaugh et al. |
| 3,641,749 A | 2/1972 | Dwyer, Jr. et al. |
| 3,959,879 A | 6/1976 | Sellers |
| 4,081,947 A | 4/1978 | Szymanis |
| 4,112,656 A | 9/1978 | Ranko et al. |
| 4,242,794 A | 1/1981 | Peterson |
| 4,509,315 A | 4/1985 | Giguere |
| 4,672,744 A | 6/1987 | Jackson et al. |
| 4,944,142 A | 7/1990 | Sueshige et al. |
| 5,493,783 A | 2/1996 | Oostendorp |
| 5,862,595 A | 1/1999 | Keane |
| 5,884,463 A | 3/1999 | Darzinskis |
| 5,970,694 A * | 10/1999 | Knox, Jr. |
| 6,085,503 A * | 7/2000 | Hutchinson |
| 6,349,475 B1 * | 2/2002 | Buck |

* cited by examiner

Primary Examiner—Boyer D. Ashley
(74) Attorney, Agent, or Firm—MacMillan, Sobanski & Todd; Donald R. Fraser

(57) ABSTRACT

A weed cutter (10) having a protective housing (32) with an air impeller (28), an air diverter (50) and a motor driven rotary cutter element (12, 14, 16, 18). The air impeller creates a vacuum to effectively pull weeds into an inlet opening (42) in the protective housing prior to contact with the cutter element and exhausting the debris through an exhaust outlet (46).

16 Claims, 4 Drawing Sheets

WEED CUTTER

This is a continuation of provisional patent application Serial No. 60/137,299, filed Jun. 3, 1999.

FIELD OF THE INVENTION

The invention relates to a weed cutter and more particularly to a weed cutter having a housing with a dependent skirt capable of shielding an internally rotating cutter element permitting the weed cutter to operate in very close proximity to buildings, foundations, fences, trees and other obstacles with maximum cutting efficiency and simultaneously avoiding contact between the cutter element and the obstacles. The weed cutter also includes an air diverter vane which creates a vacuum within the housing thereby causing weeds and grass to be drawn into the cutting area of the weed cutter prior to being cut.

BACKGROUND OF THE INVENTION

Weed cutters or trimmers are typically used to cut grass or weeds in areas where conventional lawn mowers cannot be used. These areas may be near buildings, fences, or in flower or vegetable gardens where a conventional mower has a cutting width larger than the garden rows or cannot get close enough to the buildings or fences.

Weed cutters cause debris to be randomly propelled into the air. As a result, the operator of the weed cutter may be struck by flying debris such as weeds, grass, dirt, and the like.

The cutter element of the weed cutter can also undesirably impact obstacles such as buildings, fences, trees, and the like resulting in damage to the structure or the weed cutter. Plants such as flowers and the like may also be mistakenly damaged or cut off.

An object of the present invention is to produce a weed cutter which militates against the accidental cutting of flowers and the like.

Another object of the invention is to produce a weed cutter which is capable of operating in close proximity to flowers, trees, buildings and other obstacles without accidentally contacting the obstacles.

Still another object of the invention is to produce a weed cutter capable of creating a vacuum causing the material being cut to be moved or directed toward the cutter element prior to being actually cut.

Another object of the invention is to produce a weed cutter wherein any flying debris propelled by the weed cutter is directed away from the operator.

SUMMARY OF THE INVENTION

The above, as well as other objects of the invention, may be readily achieved by a weed cutter having: a cutter element; an air impeller; a rotatable shaft, the cutter element and the air impeller mounted on the shaft; and a protective housing including a top panel having a generally V-shaped slot formed at the periphery thereof and an opening for receiving the shaft, an air diverter depending from the top panel of the housing adjacent the V-shaped slot, and a skirt depending from the top panel and generally defining the annular movement of the cutter element, the skirt having an intake opening in general registry with the V-shaped slot and a spaced apart exhaust opening.

BRIEF DESCRIPTION OF THE DRAWINGS

The above, as well as other objects, features, and advantages of the present invention will be understood from the detailed description of the preferred embodiments of the present invention with reference to the accompanying drawings, in which.

DETAILED DESCRIPTION OF THE PREFERRED EMBODIMENT

Figure 1:
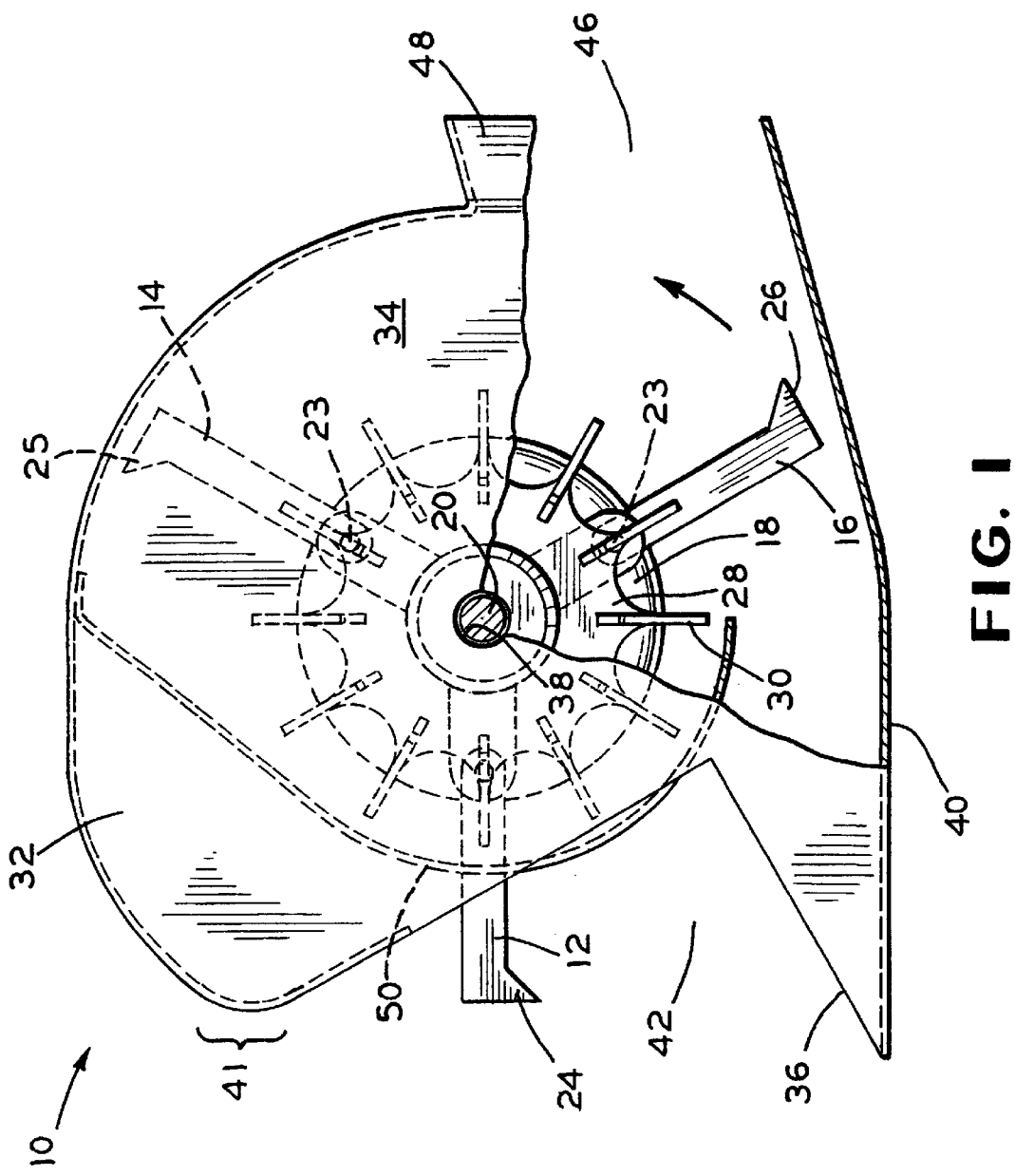
FIG. 1 is a top plan view of a weed cutter incorporating the features of the invention with a portion of the top panel cut-away to illustrate the internally disposed air impeller, cutter blades, and air deflector.
Figure 2:
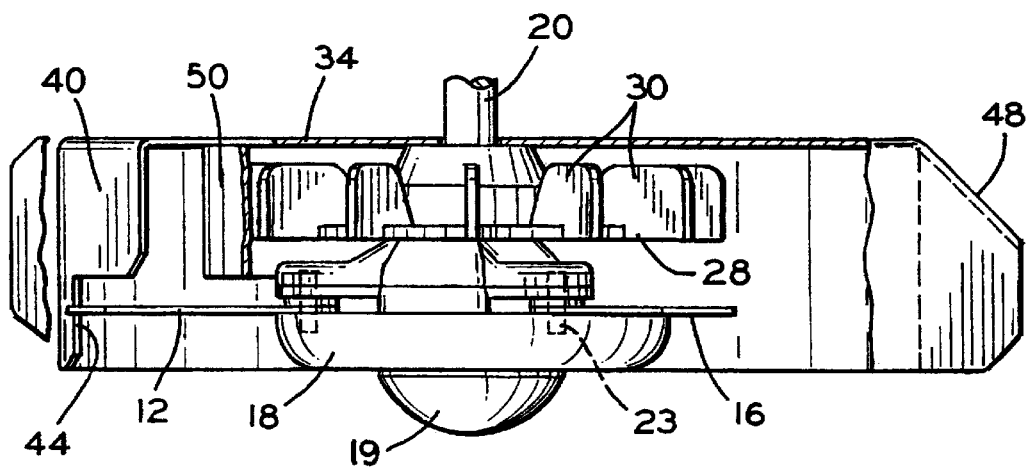
FIG. 2 is a front elevational view of the weed cutter illustrated in FIG. 1 with a portion of the depending skirt and air deflector of the housing cutaway.
Figure 3:
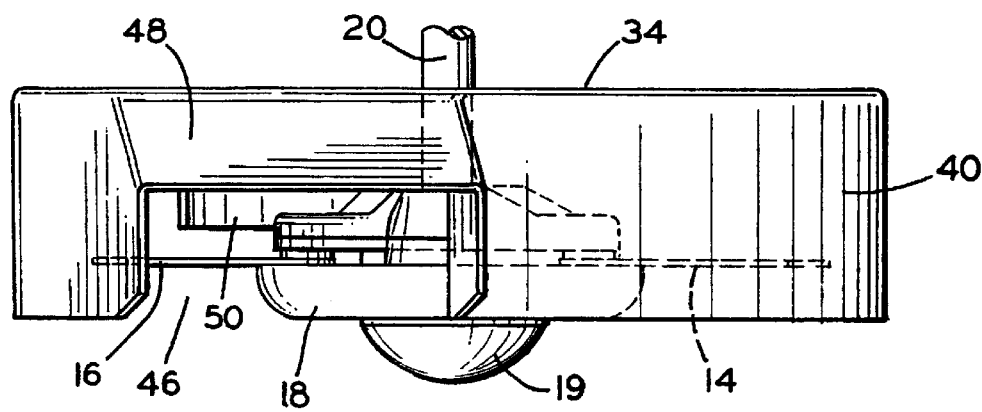
FIG. 3 is a right side elevational view of the weed cutter illustrated in FIG. 1.
Figure 4:
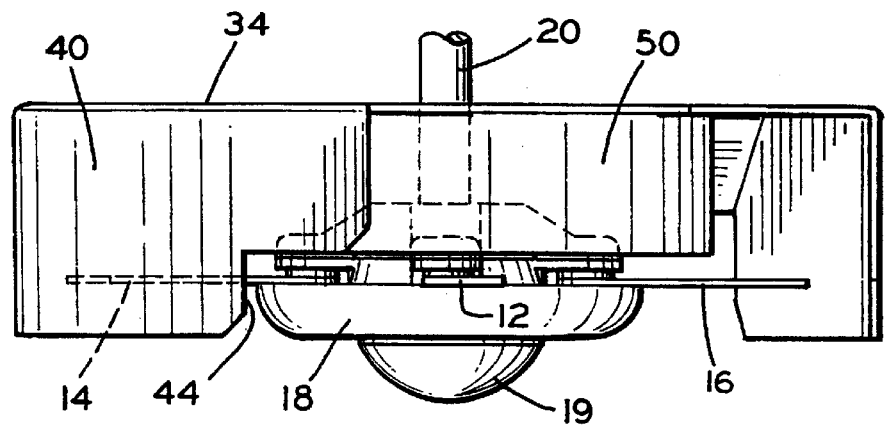
FIG. 4 is a left side elevational view of the weed cutter illustrated in FIG. 1.

Referring now to the drawings, and particularly FIG. 1, there is shown generally at 10 a weed cutter incorporating the features of the invention. The weed cutter 10 includes a cutter element. The cutter element is provided with a plurality of radially extending cutter blades 12, 14, 16 which are adapted to extend outwardly from a center hub 18. A semi-spherical ground-engaging portion 19 depends from the hub 18, as illustrated in FIGS. 2, 3, and 4. In the embodiment shown, the ground engaging portion 19 is press fit within the hub 18 and secured with O-rings 21, as clearly illustrated in FIG. 6. Radially outwardly extending projections 22, as illustrated in FIGS. 5 and 6, which are adapted to be received into suitably spaced depressions formed in the hub 18, cause the ground-engaging portion 19 conform with the movement of the hub 18.

The hub 18 is secured to one end of a motor driven rotating shaft 20. The other end of the shaft, 20 is coupled to a motor (not shown). The motor can be any conventional type such as, for example, gasoline or electrical. The shaft 20 can be coupled directly to the motor or indirectly through a belt and pulley system, for example.

Figure 5:
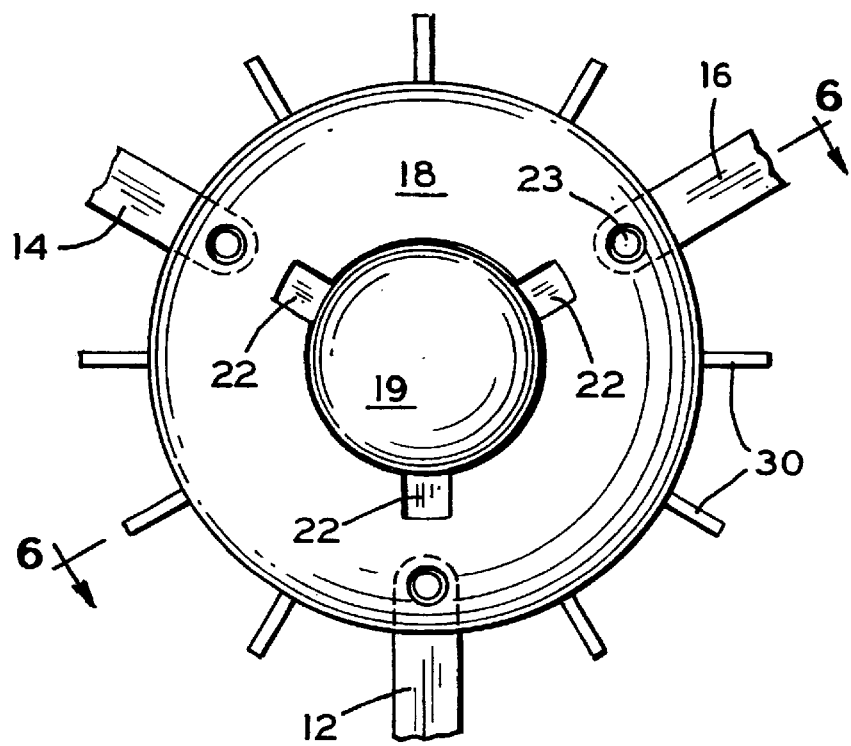
FIG. 5 is a partial bottom view of the weed cutter illustrated in FIG. 1 showing the air impeller and the cutter element including the cutter blades, the hub, and the semi-spherical ground engaging portion.
Figure 6:
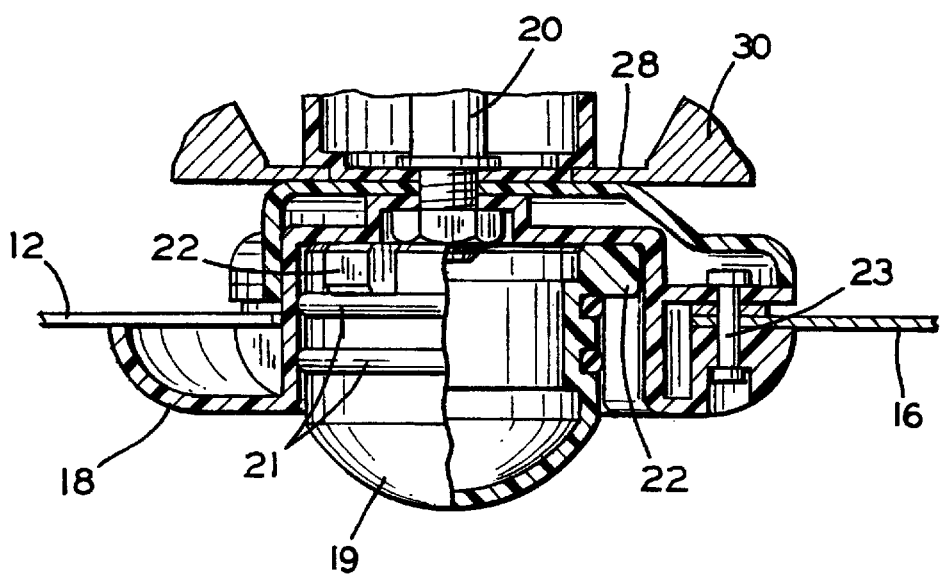
FIG. 6 is a sectional view of the air impeller and the cutter element illustrated in FIG. 5 taken along line 6—6 thereof with a portion of the hub and semi spherical ground engaging portion not sectioned to illustrate the arrangement of the O-rings.

One end of each of the cutter blades 12, 14, 16 is pivotally secured to the hub 18, as illustrated in FIG. 5, for example. In the illustrated embodiment, a fixed pin 23 is used to pivotally mount the cutter blades. 12, 14, 16, as illustrated in FIG. 6. In an alternate embodiment, a spring loaded pin can be used to permit quick changing of the cutter blades 12, 14, 16 (not shown). The spring loaded pin is depressed until the end of the pin no longer holds the cutter blades 12, 14, 16 in position, thereby freeing the cutter blades 12, 14, 16 for removal. Triangular portions 24, 25, 26 extend from the distal end of the cutter blades 12, 14, 16, respectively, toward the direction of rotation of the cutter blades 12, 14, 16. Other blade types and configurations may be used. In the embodiment shown, three blades are illustrated, but it is understood that one or more cutter blades can be used.

An air impeller 28 is secured to the shaft 20 adjacent the hub 18. The air impeller 28 includes a plurality of radially outwardly and upwardly extending air impeller blades 30, as illustrated in FIG. 2.

The cutter element, including the hub 18 and the cutter blades 12, 14, 16; and the air impeller 28, including air impeller blades, 30, are disposed within the interior of a protective housing 32. The housing 32 includes a top panel 34 having a generally V-shaped slot 36 formed at the periphery of the top panel 34 and a generally centrally disposed opening 38 for receiving the shaft 20. Typically, the top panel 34 of the housing 32 is coupled to an outer shaft (not shown) through which the shaft 20 is adapted to extend and rotate. The outer shaft is stationary and is typically grasped by the operator during the use of the weed cutter 10. One of two outer shaft types is typically used. A straight outer shaft is used whereby the shaft 20 includes a gear transfer. A curved outer shaft is used whereby the shaft 20 is a straight flexible shaft.

A skirt 40 depends from the top panel 34 and extends substantially around the peripheral marginal edge of the top panel 34. An acute angle portion 41 is formed in the skirt 40 adjacent the V-shaped slot 36 to direct air and debris within the housing 32 towards the exhaust outlet 46. An inlet opening 42 is formed in the skirt 40 in registry with the outer extremities of the V-shaped slot 36. A cut-out portion 44 is defined by the skirt 40 at the inlet opening 42 to permit the cutter blades 12, 14, 16 to pass therethrough, as illustrated in FIG. 2.

An exhaust outlet 46 is formed in the skirt 40 at a spaced distance from the inlet opening 42, as illustrated in FIG. 3. An exhaust deflector 48 is disposed adjacent the top panel 34 and is angled downwardly with respect to the top panel 34 to direct the exhausted debris and the like towards the ground.

In order to create a pressure drop at the inlet opening 42, an air diverter vane 50 is secured to and depends from the underside of the top panel 34, as illustrated in FIG. 4. The air diverter vane 50 extends substantially across the inlet opening 42 adjacent to and in substantial conformance with the terminal end of the impeller blades 30 of the air impeller 28.

In operation, the shaft 20 is caused to rotate thereby imparting rotary motion to the cutter element and the air impeller 28. The air motion caused by the air impeller 28 and directed by the air diverter vane 50 creates a vacuum at the inlet opening 42 which tends to draw weeds, grass, and the like into the V-shaped slot 36. In addition, as the cutter blades 12, 14, 16 emerge from the housing 32, the leading edge of the triangular portion 24, 25, 26 is parallel with the opposing wall of the V-shaped slot. Therefore, the cut debris is directed substantially towards the inlet opening of the housing 32 to be subsequently exhausted through the exhaust outlet 46. The cutter blades 12, 14, 16 sever the material in the V-shaped slot 36 and cause the cut material to be driven toward and expelled through the exhaust outlet 46. The debris caused thereby is well contained and not allowed to be directed toward the operator. Debris not exhausted and remaining within the housing 32 is directed substantially towards the exhaust, outlet 46 by the acute angle portion 41 formed in the skirt 40.

It will be understood that there are other embodiments of the invention. Also, it will be understood that the components of the instant weed cutter 10 may be made of aluminum, steel, or plastic.

Figure 7:
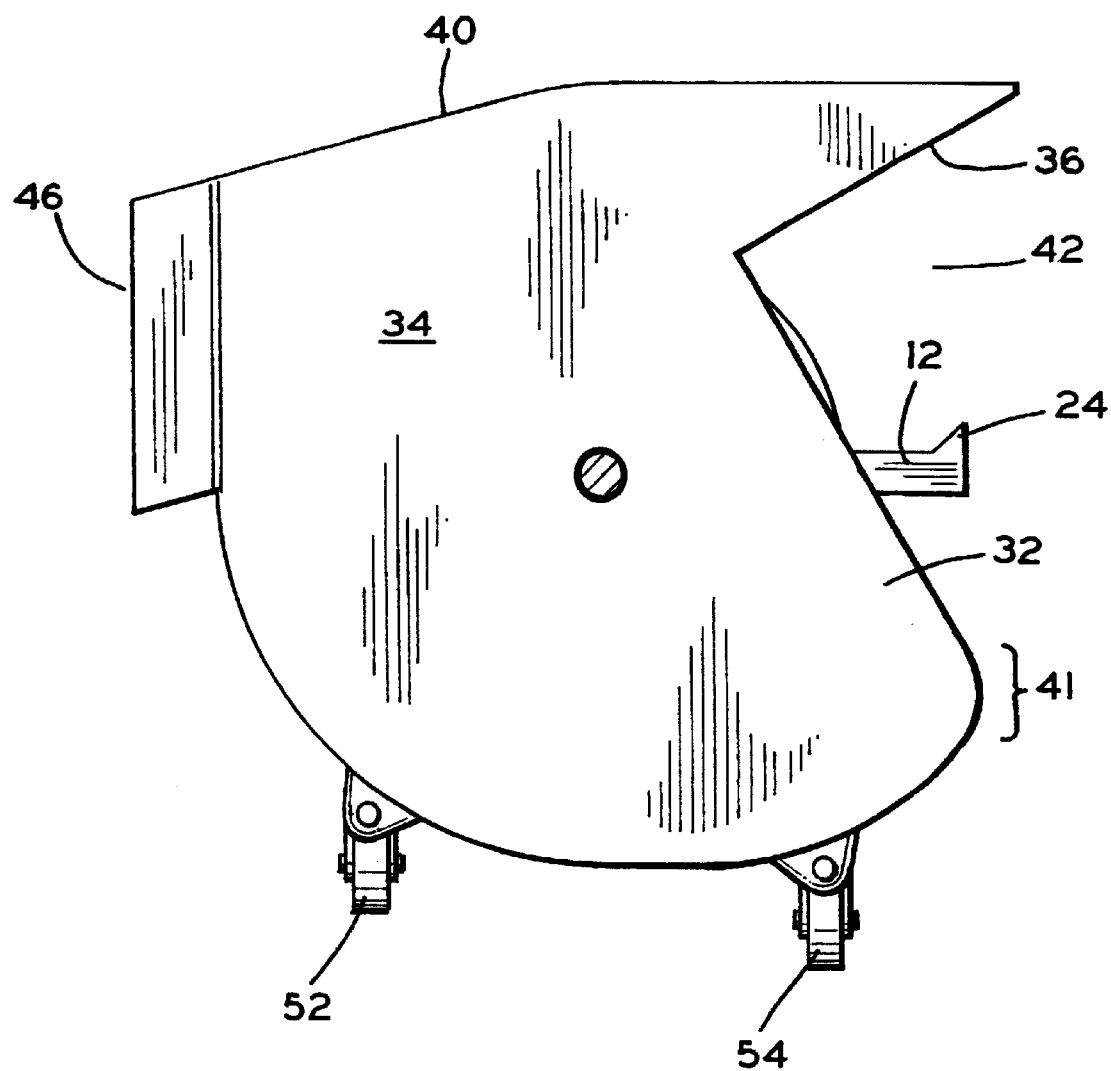
FIG. 7 is an elevational view of an alternate embodiment of the weed cutter illustrated in FIG. 1 showing ground-engaging wheels.

An alternate embodiment of the invention is illustrated in FIG. 7. A pair of ground engaging wheels 52, 54 are disposed on the rear portion of the skirt 40. In the embodiment shown, the wheels are pivotally mounted to permit the operator to easily and efficiently change the position and orientation of the weed cutter 10 with respect to any obstacles which may be present. Other wheel types could be used, for example, wheels 52, 54 could be replaced with side mounted "high-wheel" type wheels. An upwardly and rearwardly extending handle could also be added to the embodiment including wheels to improve stability and handling of the weed cutter 10.

From the foregoing description, one ordinarily skilled in the art can easily ascertain the essential characteristics of this invention and, without departing from the spirit and scope thereof, can make various changes and modifications to the invention to adapt it to various usages and conditions in accordance with the scope of the appended claims.

What is claimed is:

1. A weed cutter comprising:

a cutter element;

an air impeller;

a rotatable shaft, said cutter element and said air impeller mounted on said shaft; and a protective housing including a top panel having a generally V-shaped slot formed at a peripheral edge and an opening for receiving said shaft, an air diverter depending from the top panel of said housing adjacent the V-shaped slot, and a skirt depending from the top panel and generally defining an annular path of said cutter element, the skirt having an intake opening in general registry with the V-shaped slot and a spaced apart exhaust opening, the air diverter cooperating with said air impeller to create a vacuum at the intake open.

2. The weed cutter according to claim 1, wherein said air impeller includes an annular array of spaced apart impeller blades.

3. The weed cutter according to claim 1, including a plurality of ground engaging wheels mounted on said protective housing.

4. The weed cutter according to claim 3, wherein at least one of said wheels is pivotally mounted.

5. The weed cutter according to claim 1, wherein said cutter element includes a hub with at least one outwardly extending cutter blade.

6. The weed cutter according to claim 5, wherein the hub includes a semi-spherical ground engaging portion depending therefrom.

7. The weed cutter according to claim 5, wherein the cutter blade is pivotally mounted to the hub of said cutter element.

8. The weed cutter according to claim 7, wherein the cutter blade is removably mounted to the hub of said cutter element.

9. A weed cutter comprising:

a cutter element;

an air impeller;

a rotatable shaft;

a protective housing including a top panel having a generally V-shaped slot formed at a peripheral edge and an opening for receiving said shaft, an air diverter depending from the top panel of said housing adjacent the V-shaped slot and a skirt depending from the top panel and generally defining an annular path of said cutter element, the skirt having an intake opening in general registry with the V-shaped slot and a spaced apart exhaust opening; and means for rigidly mounting said air impeller and said cutter element on said shaft for imparting rotar motion hereto wherein said impeller and the diverter cooperate to create a pressure drop across the intake opening.

10. The weed cutter according to claim 9, wherein said air impeller includes an annular array of spaced apart impeller blades.

11. The weed cutter according to claim 9, including a plurality of ground engaging wheels mounted on said protective housing.

12. The weed cutter according to claim 11, wherein at least one of said wheels is pivotally mounted.

13. The weed cutter according to claim 9, wherein said cutter element includes a hub with at least one outwardly extending cutter blade.

14. The weed cutter according to claim 13, wherein the hub includes a semi-spherical ground engaging portion depending therefrom.

15. The weed cutter according to claim 13, wherein the cutter blade is pivotally mounted to the hub of said cutter element.

16. The weed cutter according to claim 15, wherein the cutter blade is removably mounted to the hub of said cutter element.

* * * * *